United States Patent
Heo

(10) Patent No.: US 12,043,270 B2
(45) Date of Patent: Jul. 23, 2024

(54) METHOD AND APPARATUS FOR TRACKING OBJECT AND RECORDING MEDIUM STORING PROGRAM TO EXECUTE THE METHOD

(71) Applicants: Hyundai Motor Company, Seoul (KR); Kia Corporation, Seoul (KR)

(72) Inventor: Se Jong Heo, Sejong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 290 days.

(21) Appl. No.: 17/674,611

(22) Filed: Feb. 17, 2022

(65) Prior Publication Data

US 2022/0297701 A1    Sep. 22, 2022

(30) Foreign Application Priority Data

Mar. 22, 2021    (KR) .................. 10-2021-0036537

(51) Int. Cl.
*B60W 40/105*    (2012.01)
*B60W 40/09*    (2012.01)

(52) U.S. Cl.
CPC .......... *B60W 40/105* (2013.01); *B60W 40/09* (2013.01); *B60W 2554/4041* (2020.02); *B60W 2554/4049* (2020.02)

(58) Field of Classification Search
CPC ............... B60W 40/09; B60W 40/105; B60W 2554/4041; B60W 2554/4049; G06T 7/70; G06T 7/80; G06T 7/246; G06T 7/297; G06T 2207/30261; G06V 10/62; G06V 40/103

See application file for complete search history.

(56) References Cited

U.S. PATENT DOCUMENTS

| | | | |
|---|---|---|---|
| 11,878,682 B2* | 1/2024 | Lee | G08G 1/0112 |
| 2005/0286764 A1* | 12/2005 | Mittal | G06T 7/269 382/181 |
| 2009/0245577 A1* | 10/2009 | Liu | G06V 20/56 382/103 |
| 2018/0082435 A1* | 3/2018 | Whelan | G06T 7/579 |
| 2019/0138825 A1* | 5/2019 | Lee | G06V 20/584 |
| 2020/0180646 A1* | 6/2020 | Yoo | G06N 3/08 |

(Continued)

OTHER PUBLICATIONS

2015 IEEE International Conference on Computer Vision, pp. 1904-1912 entitled "Deep Learning Strong Parts for Pedestrian Detection" downloaded on Feb. 4, 2022.

(Continued)

*Primary Examiner* — Sizo B Vilakazi
*Assistant Examiner* — Arnold Castro
(74) *Attorney, Agent, or Firm* — MORGAN, LEWIS & BOCKIUS LLP

(57) ABSTRACT

A method of tracking an object includes obtaining a likelihood of a free behavior model of the object and a likelihood of a constant speed model of the object using the position, the speed, and the type of the object determined at a previous time point and the position, the speed, and the type of the object determined at the current time point, and correcting the type of the object at the current time point using the likelihood of the free behavior model, the likelihood of the constant speed model, and the measured type of the object.

12 Claims, 10 Drawing Sheets

(56) References Cited

U.S. PATENT DOCUMENTS

2022/0297701 A1\* 9/2022 Heo ................... B60W 40/09
2023/0054759 A1\* 2/2023 Robinson ............. G01S 17/931

OTHER PUBLICATIONS

IEEE Transactions on Intelligent Transportation System, vol. 13, No. 1, Mar. 2012, entitled "Interacting Multiple Model Filter-Based Sensor Fusion of GPS With In-Vehicle Positioning".
IEEE Transactions on Intelligent Transportation System, vol. 17, No. 2, Feb. 2016, entitled "Multiple Sensor Fusion and Classification for Moving Object Detection and Tracking".
ArXiv: 1411.4304v1 [cs.CV] Nov. 16, 2014, entitled "Ten Years of Pedestrian Detection, What Have We Learned?".

\* cited by examiner

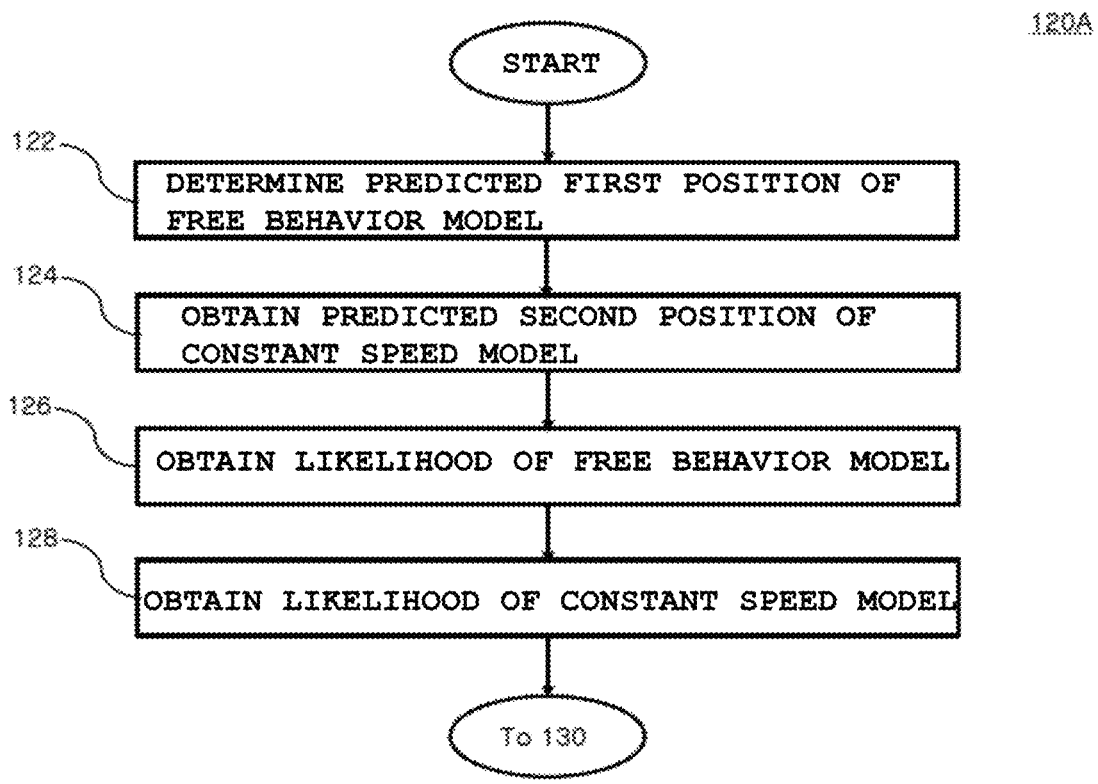

METHOD AND APPARATUS FOR TRACKING OBJECT AND RECORDING MEDIUM STORING PROGRAM TO EXECUTE THE METHOD

CROSS-REFERENCE TO RELATED APPLICATION

The present application claims priority to Korean Patent Application No. 10-2021-0036537, filed on Mar. 22, 2021, the entire contents of which is incorporated herein for all purposes by this reference.

BACKGROUND OF THE PRESENT DISCLOSURE

Field of the Present Disclosure

The present disclosure relates to a method and apparatus of tracking an object and a recording medium storing a program to execute the method.

Description of Related Art

An image detector may search for an area having the characteristics of the shape of a person in an image using a deep-learning method, and may recognize the type of object as a pedestrian. However, due to the characteristics thereof, estimation of the position and speed of an object by the image detector is inaccurate in practice. Furthermore, it may be difficult for the image sensor to accurately determine the type of object, for example, whether the object to be tracked is a pedestrian, including a person, or a two-wheeled vehicle. Therefore, various research with the goal of solving the present problem is underway.

The information included in this Background of the present disclosure section is only for enhancement of understanding of the general background of the present disclosure and may not be taken as an acknowledgment or any form of suggestion that this information forms the prior art already known to a person skilled in the art.

BRIEF SUMMARY

Various aspects of the present disclosure are directed to providing a method and apparatus of tracking an object and a recording medium storing a program to execute the method that obviate one or more problems due to limitations and disadvantages of the related art.

Embodiments provide a method and apparatus of tracking an object, which accurately determine the type of object and thus exhibit excellent object-tracking performance, and a recording medium storing a program to execute the method.

However, the objects to be accomplished by the exemplary embodiments are not limited to the above-mentioned objects, and other objects not mentioned herein will be clearly understood by those skilled in the art from the following description.

A method of tracking an object according to an exemplary embodiment of the present disclosure may include (a) obtaining a likelihood of a free behavior model of the object and a likelihood of a constant speed model of the object using the position, the speed, and the type of the object determined at a previous time point (t−1) and the position, the speed, and the type of the object determined at the current time point (t), and (b) correcting the type of the object at the current time point using the likelihood of the free behavior model, the likelihood of the constant speed model, and the determined type of the object.

For example, step (a) may include determining the position of the object obtained at the previous time point (t−1) as a predicted first position of the free behavior model of the object, obtaining a predicted second position of the constant speed model of the object using the position and the speed of the object obtained at the previous time point (t−1), obtaining the likelihood of the free behavior model using the first position and the determined position, and obtaining the likelihood of the constant speed model using the second position and the determined position.

For example, the likelihood of the free behavior model may be obtained as follows.

$$L1 = \frac{1}{\sqrt{2\pi}} e^{-0.5 MH1^2}$$

$$MH1^2 = \frac{(PP1 - MP)^2}{C1}$$

Here, "L1" represents the likelihood of the free behavior model, "MH1" represents a Mahalanobis distance, "PP1" represents the first position, "MP" represents the determined position, and "C1" represents a covariance of the first position.

For example, the likelihood of the constant speed model may be obtained as follows.

$$L2 = \frac{1}{\sqrt{2\pi}} e^{-0.5 MH2^2}$$

$$MH2^2 = \frac{(PP2 - MP)^2}{C2}$$

Here, "L2" represents the likelihood of the constant speed model, "MH2" represents a Mahalanobis distance, "PP2" represents the second position, "MP" represents the determined position, and "C2" represents a covariance of the second position.

For example, step (a) may further include sensing the position, the speed, and the type of the object using a plurality of detectors at the current time point, and determining a virtual position, a virtual speed, and a virtual type, respectively, generated using the position, the speed, and the type detected by the plurality of detectors according to the predetermined accuracy of each of the detectors, as the determined position, the determined speed, and the determined type, respectively.

For example, step (b) may include determining, when the determined type is a first type and when the likelihood of the free behavior model is greater than a first threshold value, the type of the object corrected at the current time point as the first type, determining whether the likelihood of the constant speed model is greater than a second threshold value when the determined type is the first type and when the likelihood of the free behavior model is equal to or less than the first threshold value, determining the type of the object corrected at the current time point as a second type when the likelihood of the constant speed model is greater than the second threshold value, the second type being different from the first type, determining the type of the object corrected at the current time point as the first type when the likelihood of the constant speed model is equal to or less than the second threshold value, determining the type of the object corrected at the current time point as the first type when the determined type is an unknown type and when the likelihood of the free behavior model is greater than the first threshold value, and determining the type of the object corrected at the current time point as the unknown type when the determined type is the unknown type and when the likelihood of the free behavior model is equal to or less than the first threshold value.

For example, step (b) may further include not determining the type of the object corrected at the current time point when the determined type is neither the first type nor the unknown type.

For example, one of the first type and the second type may be a pedestrian type, and the remaining one of the first type and the second type may be a two-wheeled vehicle type.

An apparatus of tracking an object according to another exemplary embodiment of the present disclosure may include a filter configured to generate a likelihood of a free behavior model of the object and a likelihood of a constant speed model of the object using the position, the speed, and the type of the object determined at a previous time point (t−1) and the position, the speed, and the type of the object determined at the current time point (t), and a type corrector configured to correct the type of the object at the current time point using the likelihood of the free behavior model, the likelihood of the constant speed model, and the determined type of the object.

For example, the filter may include a free behavior model device configured to divert the position of the object obtained at the previous time point (t−1) as a predicted first position of the free behavior model of the object, a constant speed model device configured to generate a predicted second position of the constant speed model of the object using the position and the speed of the object obtained at the previous time point (t−1), and a likelihood generator configured to generate the likelihood of the free behavior model using the first position and the determined position and to generate the likelihood of the constant speed model using the second position and the determined position.

For example, the free behavior model device may generate the likelihood of the free behavior model as follows.

$$L1 = \frac{1}{\sqrt{2\pi}} e^{-0.5 MH1^2}$$

$$MH1^2 = \frac{(PP1 - MP)^2}{C1}$$

Here, "L1" represents the likelihood of the free behavior model, "MH1" represents a Mahalanobis distance, "PP1" represents the first position, "MP" represents the determined position, and "C1" represents a covariance of the first position.

For example, the constant speed model device may generate the likelihood of the constant speed model as follows.

$$L2 = \frac{1}{\sqrt{2\pi}} e^{-0.5 MH2^2}$$

$$MH2^2 = \frac{(PP2 - MP)^2}{C2}$$

Here, "L2" represents the likelihood of the constant speed model, "MH2" represents a Mahalanobis distance, "PP2" represents the second position, "MP" represents the determined position, and "C2" represents a covariance of the second position.

For example, the apparatus may further include a sensing unit including a plurality of detectors configured to detect the position, the speed, and the type of the object at the current time point.

For example, the filter may further include a measured value generator configured to output a virtual position, a virtual speed, and a virtual type, respectively, generated using the position, the speed, and the type detected by the plurality of detectors according to the predetermined accuracy of each of the detectors, as the determined position, the determined speed, and the determined type, respectively.

For example, the type corrector may include a type inspector configured to inspect whether the determined type is a first type or an unknown type and to output a result of inspection as a control signal, a first comparator configured to compare the likelihood of the free behavior model with a first threshold value in response to the control signal, a second comparator configured to compare the likelihood of the constant speed model with a second threshold value in response to a result of comparison by the first comparator, a first type output unit configured to determine the type of the object at the current time point as the first type or a second type in response to a result of comparison by the first comparator or the second comparator, the second type being different from the first type, and a second type output unit configured to determine the type of the object at the current time point as the first type or the unknown type in response to the control signal and a result of comparison by the first comparator.

According to various exemplary embodiments of the present disclosure, a recording medium in which a program for executing a method of tracking an object is recorded may store a program to implement functions of (a) obtaining a likelihood of a free behavior model of the object and a likelihood of a constant speed model of the object using the position, the speed, and the type of the object determined at a previous time point (t−1) and the position, the speed, and the type of the object determined at the current time point (t), and (b) correcting the type of the object at the current time point using the likelihood of the free behavior model, the likelihood of the constant speed model, and the determined type of the object. The recording medium may be read by a computer system.

For example, function (a) may include a function of determining the position of the object obtained at the previous time point (t−1) as a predicted first position of the free behavior model of the object, a function of obtaining a predicted second position of the constant speed model of the object using the position and the speed of the object obtained at the previous time point (t−1), a function of obtaining the likelihood of the free behavior model using the first position and the determined position, and a function of obtaining the likelihood of the constant speed model using the second position and the determined position.

For example, function (b) may include a function of determining, when the determined type is a first type and when the likelihood of the free behavior model is greater than a first threshold value, the type of the object corrected at the current time point as the first type, a function of determining whether the likelihood of the constant speed model is greater than a second threshold value when the determined type is the first type and when the likelihood of the free behavior model is equal to or less than the first threshold value, a function of determining the type of the object corrected at the current time point as a second type when the likelihood of the constant speed model is greater than the second threshold value, the second type being different from the first type, a function of determining the type of the object corrected at the current time point as the first type when the likelihood of the constant speed model is equal to or less than the second threshold value, a function of determining the type of the object corrected at the current time point as the first type when the determined type is an unknown type and when the likelihood of the free behavior model is greater than the first threshold value, and a function of determining the type of the object corrected at the current time point as the unknown type when the determined type is the unknown type and when the likelihood of the free behavior model is equal to or less than the first threshold value.

The methods and apparatuses of the present disclosure have other features and advantages which will be apparent from or are predetermined forth in more detail in the accompanying drawings, which are incorporated herein, and the following Detailed Description, which in combination serve to explain certain principles of the present disclosure.

BRIEF DESCRIPTION OF THE DRAWINGS

FIG. 3 is a flowchart for explaining an exemplary embodiment of step 120 shown in FIG. 1;

Figure 1:
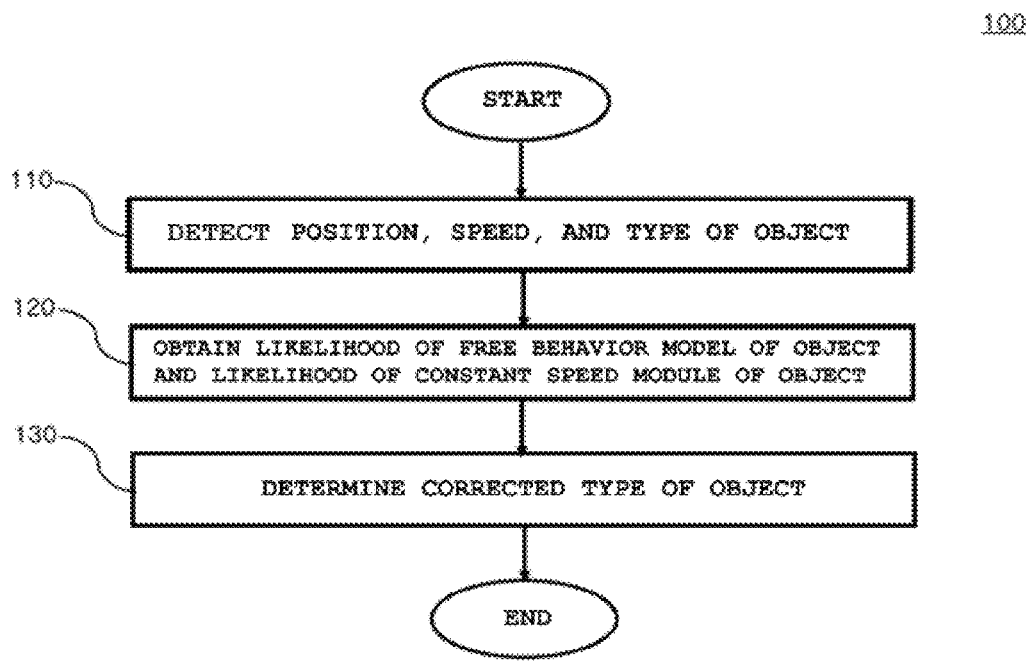
FIG. 1 is a flowchart for explaining an object-tracking method according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the plurality of figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is intended to cover not only the exemplary embodiments of the present disclosure, but various alternatives, modifications, equivalents and other embodiments, which may be included within the spirit and scope of the present disclosure as defined by the appended claims.

The present disclosure will now be described more fully hereinafter with reference to the accompanying drawings, in which various embodiments are shown. The examples, however, may be embodied in many different forms, and is configured to not be construed as being limited to the embodiments predetermined forth herein. Rather, these embodiments are provided so that the present disclosure will be more thorough and complete, and will more fully convey the scope of the present disclosure to those skilled in the art.

It will be understood that when an element is referred to as being "on" or "under" another element, it may be directly on/under the element, or one or more intervening elements may be present.

When an element is referred to as being "on" or "under", "under the element" as well as "on the element" may be included based on the element.

Furthermore, relational terms, including "first", "second", "on/upper part/above" and "under/lower part/below", are used to distinguish between one subject or element and another subject or element, without necessarily requiring or involving any physical or logical relationship or sequence between the subjects or elements.

Hereinafter, a method and apparatus of tracking an object and a recording medium storing a program to execute the method according to exemplary embodiments will be described with reference to the accompanying drawings.

FIG. 1 is a flowchart for explaining an object-tracking method 100 according to an exemplary embodiment of the present disclosure.

According to the object-tracking method 100 according to the exemplary embodiment of the present disclosure, the position, speed, and type of an object may be detected at the current time point t (step 110).

After step 110, a likelihood of the free behavior model of the object to be tracked and a likelihood of the constant speed model of the object are obtained using a position (hereinafter referred to as a "previous position"), a speed (hereinafter referred to as a "previous speed"), and a type (hereinafter referred to as a "previous type") of the object determined at a previous time point t−1 and a position (hereinafter referred to as a "measured position"), a speed (hereinafter referred to as a "measured speed"), and a type (hereinafter referred to as a "measured type") of the object measured at the current time point t (step 120).

In step 110, the position, speed, and type of the object may be detected using one detector, or the position, speed, and type of the object may be detected using a plurality of detectors.

If the position, the speed, and the type of the object are detected using a plurality of detectors at the current time point, a virtual position, a virtual speed, and a virtual type may be generated, respectively, using the position, the speed, and the type detected by the plurality of detectors according to the predetermined accuracy of each of the detectors, and the virtual position, the virtual speed, and the virtual type that are generated may be respectively determined to be the measured position, the measured speed, and the measured type in step 120.

That is, a virtual position may be generated using the positions detected by the plurality of detectors, and the generated virtual position may be determined as the measured position. Furthermore, a virtual speed may be generated using the speeds detected by the plurality of detectors, and the generated virtual speed may be determined as the measured speed. Furthermore, a virtual type may be generated using the types detected by the plurality of detectors, and the generated virtual type may be determined as the measured type.

For example, assuming that the virtual position includes a vertical-axis position and a horizontal-axis position, the position detected by a detector determined to have highest accuracy with respect to a vertical-axis position among the plurality of detectors may be determined as the vertical-axis position, the position detected by a detector determined to have highest accuracy with respect to a horizontal-axis position among the plurality of detectors may be determined as the horizontal-axis position, and the virtual position including the vertical-axis position and the horizontal-axis position may be determined as the measured position of the object determined at the current time point. The measured speed and the measured type may be determined in a manner similar to the manner in which the measured position is determined.

The measured type of the object according to the exemplary embodiment may be classified as a "small vehicle", a "large vehicle", a "pedestrian", a "two-wheeled vehicle", or an "unknown type", but the exemplary embodiments are not limited to any specific type of object.

Hereinafter, the likelihood of the free behavior model and the likelihood of the constant speed model obtained in step 120 will be described.

Figure 2A:
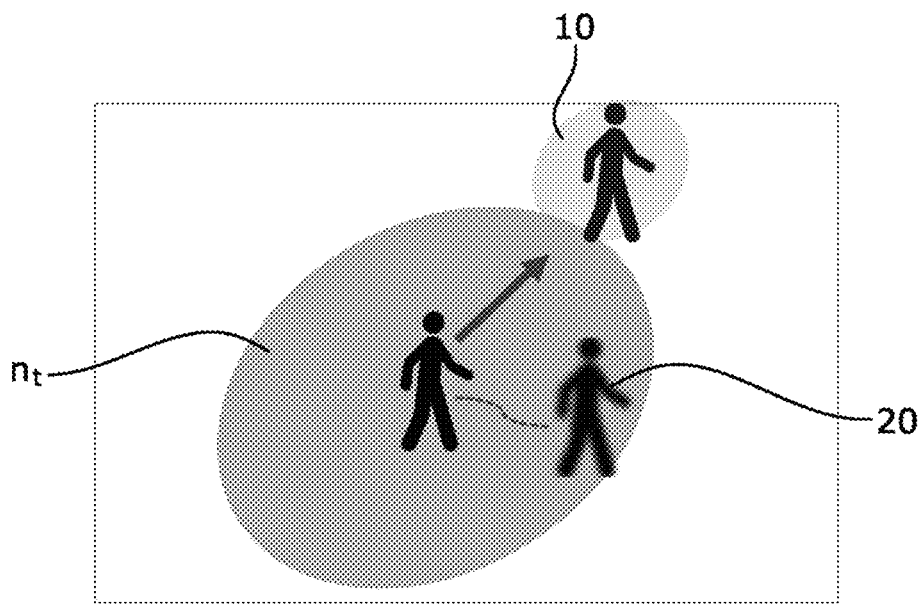
FIG. 2A and FIG. 2B are diagrams for explaining a free behavior model and a constant speed model, respectively.
Figure 2B:
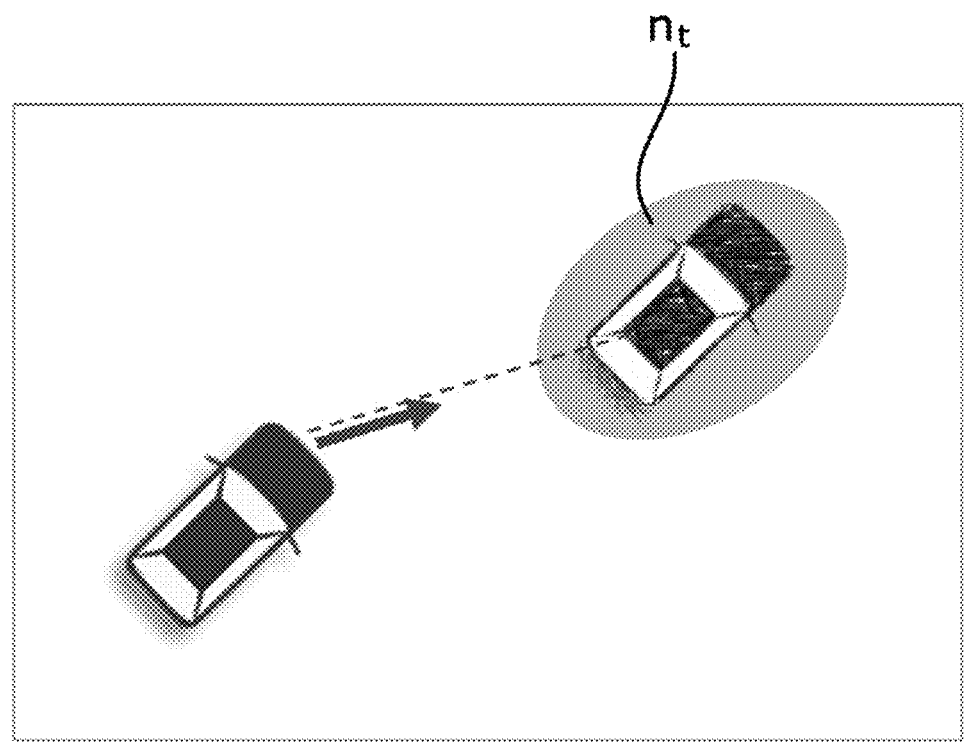

FIG. 2A and FIG. 2B are diagrams for explaining the free behavior model and the constant speed model, respectively. FIG. 2A is a diagram for explaining the free behavior model when the object is a pedestrian, and FIG. 2B is a diagram for explaining the constant speed model when the object is a vehicle.

The free behavior model refers to modeling in the case in which an object located at a certain position at the current time point (or the previous time point) can move in any direction and to any position at a next time point (or the current time point). That is, the free behavior model is mainly used when a specific behavior model cannot be defined for the movement of an object. When the object is a pedestrian, the pedestrian moves at a low speed, and it is impossible to accurately estimate the speed using a detector used for detector fusion. For the present reason, the free behavior model is suitable for modeling the movement of a pedestrian, which is the object.

In the free behavior model, the movement of an object may be quantitatively expressed using Equation 1 below.

$$P_{t+1}=P_t+n_t \qquad \text{[Equation 1]}$$

Here, "$P_t$" represents a factor indicating the position (or the speed or the type) of the object at the current time point t, "$P_{t+1}$" represents a factor indicating the position at which the object is predicted to be located at a next time point t+1, and "$n_t$" represents uncertainty.

The constant speed model refers to modeling in the case in which the direction in which and the position to which an object located at a certain position at the current time point (or the previous time point) can move at the next time point (or the current time point) while maintaining the current speed are predicted to a greater extent than the free behavior model. That is, the constant speed model is mainly used when the object moves while maintaining the current speed. When the speed of the object is high, for example, when the object is a vehicle including a two-wheeled vehicle, the constant speed model is more suitable for tracking the object than the free behavior model.

In the constant speed model, the movement of an object may be quantitatively expressed using Equation 2 below.

$$P_{t+1}=P_t+v_t\Delta t+n_t \qquad \text{[Equation 2]}$$

Here, "$v_t$" represents information on the speed of the object, and "$\Delta t$" represents the time difference between the present time point and the next time point.

In the case of a free behavior model, it is common to set the uncertainty $n_t$ to be large because it is impossible to predict the behavior of an object. Therefore, the uncertainty $n_t$ of the constant speed model shown in Equation 2 and FIG. 2B may be set to be lower than the uncertainty $n_t$ of the free behavior model shown in Equation 1 and FIG. 2A.

In the case in which the object is a pedestrian, the predicted position 10 of the pedestrian predicted by the constant speed model and the actual moving position 20 of the pedestrian measured by a detector are different from each other, and thus the position of the pedestrian detected by the detector is ignored. Accordingly, it may be seen that selecting a behavior model suitable for the characteristics of an object is essential in stably performing object-tracking operation.

FIG. 3 is a flowchart for explaining an exemplary embodiment 120A of step 120 shown in FIG. 1.

The previous position of the object obtained at the previous time point t−1 is determined as a predicted position of the free behavior model of the object (hereinafter referred to as a "first position") (step 122). On the assumption that the object is configured to move regardless of the previous speed thereof, the free behavior model determines the previous position as the first position.

After step 122, a predicted position of the constant speed model of the object (hereinafter referred to as a "second position") is obtained using the previous position and the previous speed (step 124). On the assumption that the object is moving while maintaining the previous speed, the constant speed model generates the second position of the object, which is predicted when the previous speed is maintained.

Although it is illustrated in FIG. 3 that step 124 is performed after step 122 is performed, the exemplary embodiments are not limited thereto. That is, according to another exemplary embodiment of the present disclosure, step 122 may be performed after step 124 is performed, or step 122 and step 124 may be performed simultaneously.

The likelihood of the free behavior model is obtained using the first position and the measured position (step 126).

For example, in step 126, the likelihood L1 of the free behavior model may be obtained using Equation 3 below.

$$L1 = \frac{1}{\sqrt{2\pi}} e^{-0.5MH1^2} \qquad \text{[Equation 3]}$$

Here, "MH1" represents a Mahalanobis distance, and may be expressed using Equation 4 below.

$$MH1^2 = \frac{(PP1 - MP)^2}{C1} \qquad \text{[Equation 4]}$$

Here, "PP1" represents the first position, "MP" represents the measured position, and "C1" represents the covariance of the first position.

After step 126, the likelihood of the constant speed model is obtained using the second position and the measured position (step 128).

For example, in step 128, the likelihood L2 of the constant speed model may be obtained using Equation 5 below.

$$L2 = \frac{1}{\sqrt{2\pi}} e^{-0.5MH2^2} \qquad \text{[Equation 5]}$$

Here, "MH2" represents a Mahalanobis distance, and may be expressed using Equation 6 below.

$$MH2^2 = \frac{(PP2 - MP)^2}{C2} \qquad \text{[Equation 6]}$$

Here, "PP2" represents the second position, and "C2" represents the covariance of the second position.

Although it is illustrated in FIG. 3 that step 128 is performed after step 126 is performed, the exemplary embodiments are not limited thereto. That is, according to another exemplary embodiment of the present disclosure, step 126 may be performed after step 128 is performed, or step 126 and step 128 may be performed simultaneously.

Although it is illustrated in FIGS. 1 and 3 that only the likelihood of the free behavior model and the likelihood of the constant speed model are generated, the exemplary embodiments are not limited thereto, and the likelihood of any other behavior model may be generated.

Referring again to FIG. 1, after step 120, the type of the object corrected at the current time point is determined using the likelihood of the free behavior model, the likelihood of the constant speed model, and the measured type of the object (step 130).

Figure 4:
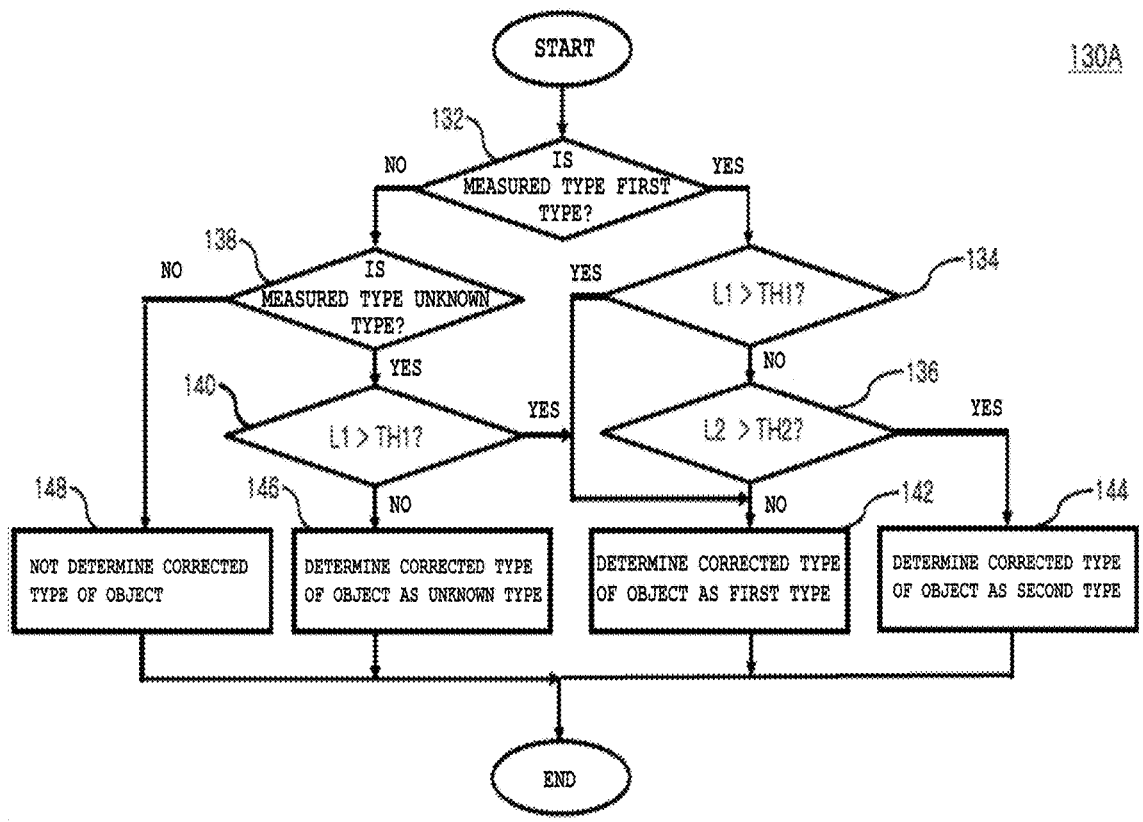
FIG. 4 is a flowchart for explaining an exemplary embodiment of step 130 shown in FIG. 1.

FIG. 4 is a flowchart for explaining an exemplary embodiment 130A of step 130 shown in FIG. 1.

First, whether the measured type of the object is a first type is determined (step 132).

If the measured type is the first type, whether the likelihood of the free behavior model is greater than a first threshold value TH1 is determined (step 134). When the likelihood of the free behavior model is greater than the first threshold value TH1, the type of the object corrected at the current time point is determined as the first type (step 142).

However, when the measured type is the first type and the likelihood of the free behavior model is equal to or less than the first threshold value TH1, whether the likelihood of the constant speed model is greater than a second threshold value TH2 is determined (step 136). When the likelihood of the constant speed model is greater than the second threshold value TH2, the type of the object corrected at the current time point is determined as a second type, which is different from the first type (step 144). On the other hand, when the likelihood of the constant speed model is equal to or less than the second threshold value TH2, the type of the object corrected at the current time point is determined as the first type (step 142).

On the other hand, when the measured type is not the first type, whether the measured type is an unknown type is determined (step 138). When the measured type is the unknown type, whether the likelihood of the free behavior model is greater than the first threshold value TH1 is determined (step 140). When the likelihood of the free behavior model is greater than the first threshold value TH1, the type of the object corrected at the current time point is determined as the first type (step 142). On the other hand, when the measured type is the unknown type but the likelihood of the free behavior model is equal to or less than the first threshold value TH1, the type of the object corrected at the current time point is determined as the unknown type (step 146).

If the measured type is neither the first type nor the unknown type, the type of the object corrected at the current time point is not determined (step 148).

For example, one of the first type determined in step 142 and the second type determined in step 144 may be a pedestrian type, and the other one of the first type and the second type may be a two-wheeled vehicle type.

Hereinafter, an object-tracking apparatus 200 according to an exemplary embodiment will be described with reference to the accompanying drawings.

Figure 5:
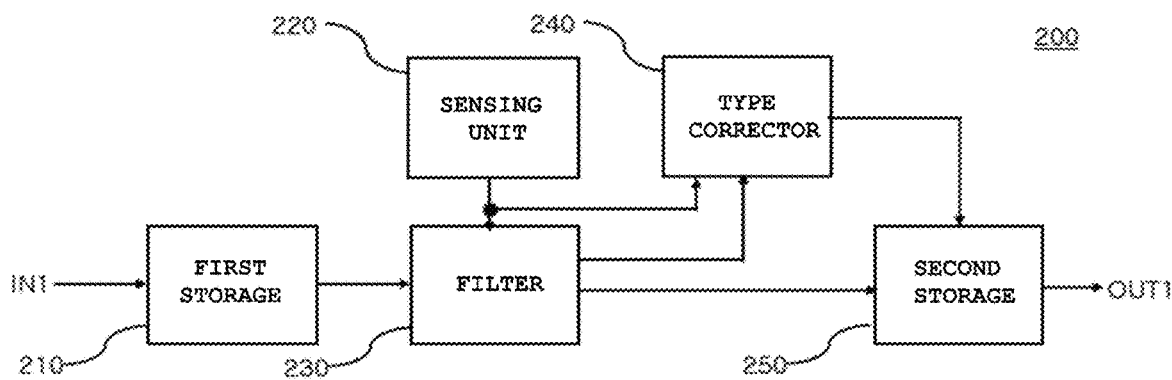
FIG. 5 is a block diagram of an object-tracking apparatus according to an exemplary embodiment of the present disclosure.

FIG. 5 is a block diagram of an object-tracking apparatus 200 according to an exemplary embodiment of the present disclosure. The object-tracking apparatus 200 may include a first storage 210, a sensing unit 220, a filter 230, a type corrector 240, and a second storage 250.

Although the object-tracking method 100 shown in FIG. 1 will be referred to as being performed by the object-tracking apparatus 200 shown in FIG. 5 for convenience of description, the exemplary embodiments are not limited thereto. That is, according to another exemplary embodiment of the present disclosure, the object-tracking method 100 shown in FIG. 1 may be performed by an object-tracking apparatus configured differently from the object-tracking apparatus 200 shown in FIG. 5. Although the object-tracking apparatus 200 shown in FIG. 5 will be referred to as performing the object-tracking method 100 shown in FIG. 1, the exemplary embodiments are not limited thereto. That is, according to another exemplary embodiment of the present disclosure, the object-tracking apparatus 200 shown in FIG. 5 may perform an object-tracking method different from the object-tracking method 100 shown in FIG. 1.

The sensing unit 220 detects the position, the speed, and the type of the object at the current time point. That is, the sensing unit 220 is configured to perform step 110 shown in FIG. 1.

Figure 6:
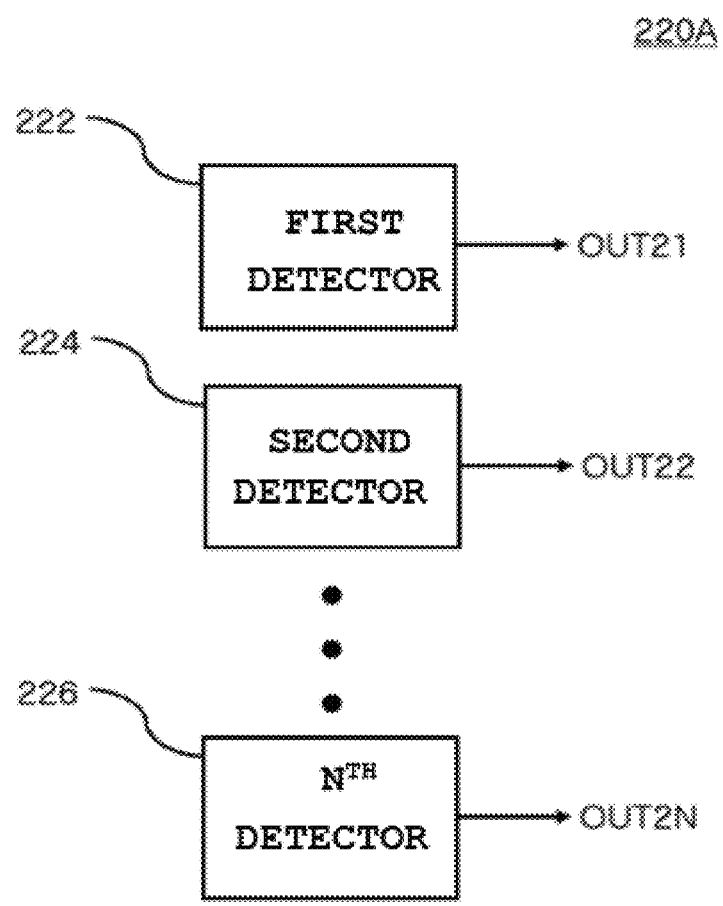
FIG. 6 is a block diagram of an exemplary embodiment of the sensing unit shown in FIG. 5.

FIG. 6 is a block diagram of an exemplary embodiment 220A of the sensing unit 220 shown in FIG. 5. The sensing unit 220A may include first to $N^{th}$ detectors 222, 224, and 226. Here, "N" is a positive integer of claim 1 or greater.

The sensing unit 220 may include one detector (N=1), or may include a plurality of detectors (N=2 or greater). The $n^{th}$ detector ($1 \leq n \leq N$) may detect the position, the speed, and the type of the object, and may output a result of sensing to the filter 230 through an output terminal OUT2$n$.

For example, each of the first to $N^{th}$ detectors 222, 224, and 226 may be a camera, a Light Detection and Ranging (LiDAR) detector, or a Radio Detection and Ranging (RaDAR) detector, but the exemplary embodiments are not limited to any specific type of each of the first to $N^{th}$ detectors 222, 224, and 226.

The filter 230 generates the likelihood of the free behavior model of the object and the likelihood of the constant speed model of the object using the previous position, previous speed, and previous type of the object received from the first storage 210, and the position, the speed, and the type of the object measured at the current time point t, and outputs the generated likelihood of the free behavior model and the generated likelihood of the constant speed model to the type corrector 240. That is, the filter 230 performs step 120 shown in FIG. 1.

Figure 7:
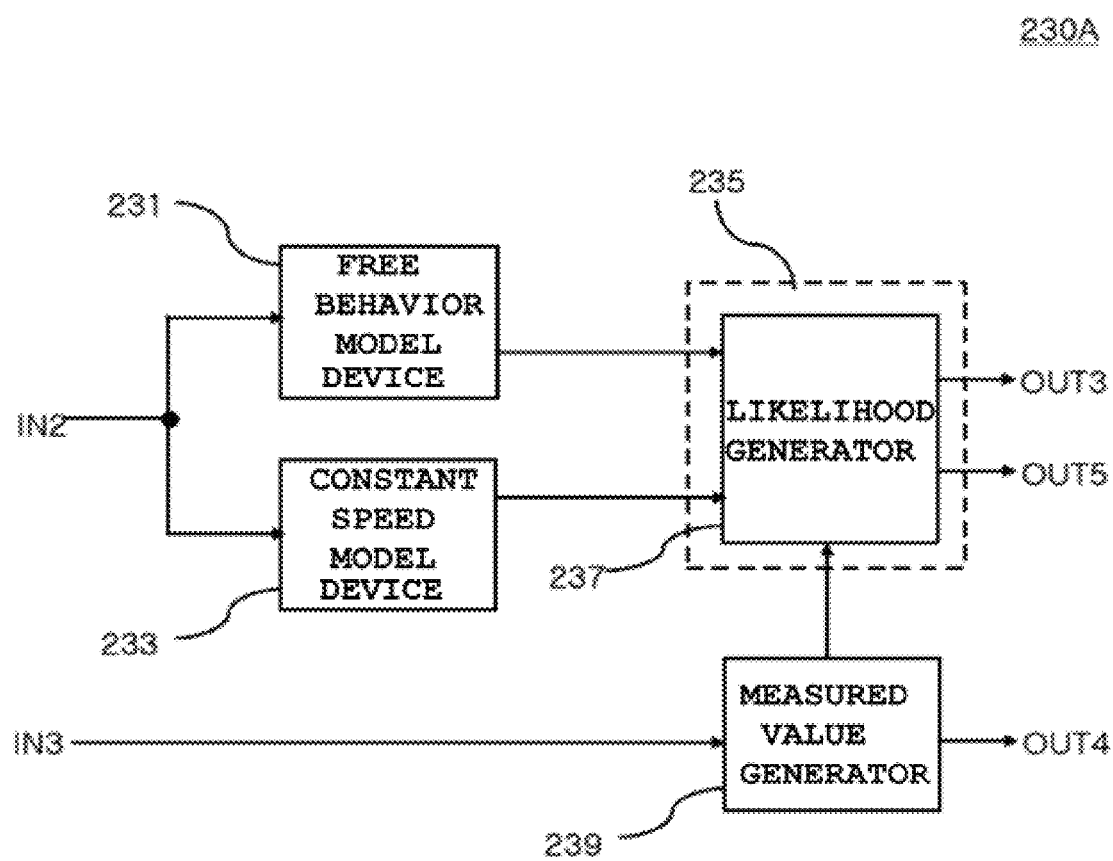
FIG. 7 is a block diagram of an exemplary embodiment of the filter shown in FIG. 5.

FIG. 7 is a block diagram of an exemplary embodiment 230A of the filter 230 shown in FIG. 5.

The filter 230A shown in FIG. 7 may include a free behavior model device 231, a constant speed model device 233, and a likelihood generator 237.

The free behavior model device 231 receives the previous position of the object, obtained at the previous time point t−1, from the first storage 210 through an input terminal IN2, and diverts the previous position to the likelihood generator 237 as the predicted first position of the free behavior model of the object. That is, the free behavior model device 231 is configured to perform step 122 shown in FIG. 3.

The constant speed model device 233 receives the previous position and the previous speed of the object, obtained at the previous time point t−1, from the first storage 210 through the input terminal IN2, generates a predicted second position of the constant speed model of the object using the previous position and the previous speed, and outputs the generated second position to the likelihood generator 237. That is, the constant speed model device 233 is configured to perform step 124 shown in FIG. 3.

The likelihood generator 237 generates the likelihood of the free behavior model using the first position and the measured position, generates the likelihood of the constant speed model using the second position and the measured position, and outputs the generated likelihood of the free behavior model and the generated likelihood of the constant speed model to the type corrector 240 through an output terminal OUT3. For example, the likelihood generator 237 may generate the likelihood of the free behavior model, as shown in Equation 3 above, and may generate the likelihood of the constant speed model, as shown in Equation 5 above. That is, the likelihood generator 237 is configured to perform steps 126 and 128 shown in FIG. 3.

If the sensing unit 220 includes one detector, the sensing unit 220 outputs the detected position, the detected speed, and the detected type to the filter 230, and outputs the detected type to the type corrector 240.

If the sensing unit 220 includes a plurality of detectors, the filter 230A may further include a measured value generator 239.

The measured value generator 239 may generate a virtual position, a virtual speed, and a virtual type, respectively, according to the position, the speed, and the type detected by the plurality of detectors 222, 224, and 226 included in the sensing unit 220 in consideration of the predetermined accuracy of each of the detectors 222, 224, and 226. The measured value generator 239 may output the generated virtual type to the likelihood generator 237 as the measured type, and at the same time, may output the same to the type corrector 240 through an output terminal OUT4. The measured value generator 239 may output the virtual position to the likelihood generator 237 as the measured position, and may output the virtual speed to the likelihood generator 237 as the measured speed.

The filter 230 may further include a joint probability distribution calculator 235. The joint probability distribution calculator 235 may determine a final joint distribution using the likelihood of the free behavior model and the likelihood of the constant speed model generated by the likelihood generator 237, may compensate for the measurement of a Kalman filter based thereon, and may output a result of compensation to the second storage 250 as the speed and the position of the object determined at the current time point.

Figure 8A:
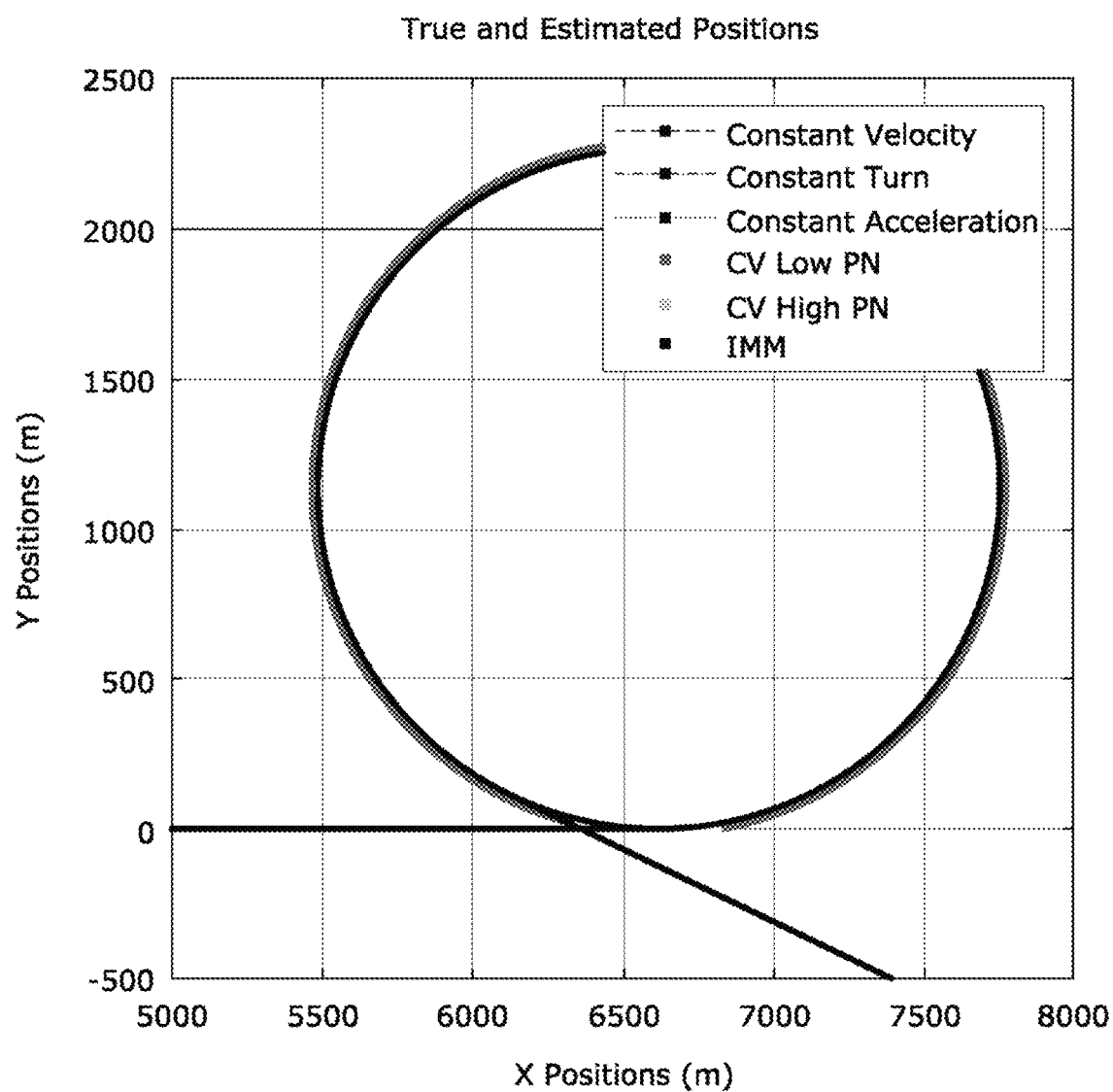
FIG. 8A and FIG. 8B are diagrams for explaining the filter shown in FIG. 5.
Figure 8B:
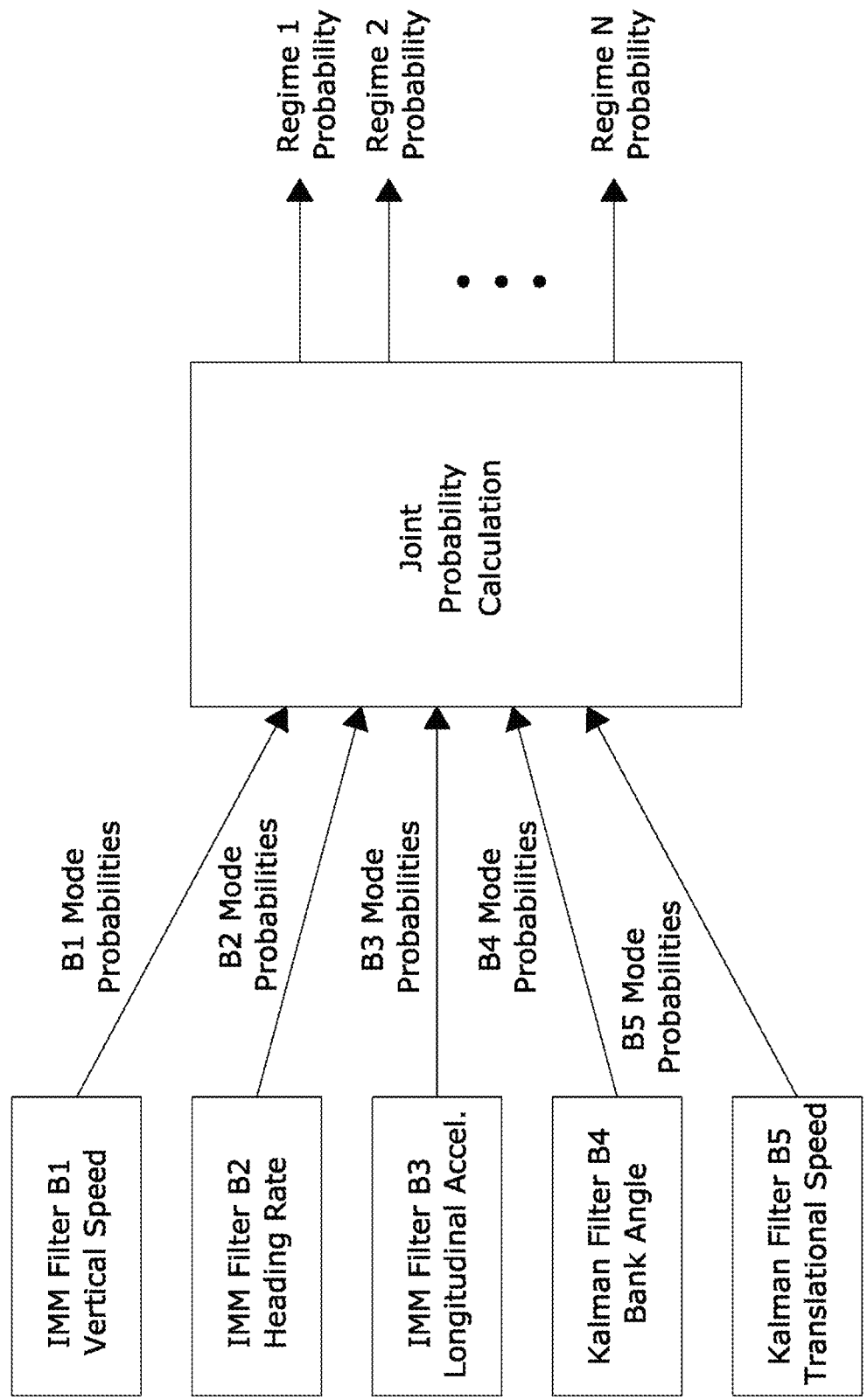

FIG. 8A and FIG. 8B are diagrams for explaining the filter 230 shown in FIG. 5.

For example, the filter 230 may be an Interacting Multiple Model (IMM) filter according to a multi-behavior model, and changes in the behavior model may be tracked using the IMM filter. An example of the IMM filter according to the multi-behavior model is shown in FIG. 8B. The behavior of the object tracked by the detector fusion may change. For example, as shown in FIG. 8A, to respond to the case in which the constant speed model is changed to an isorotation model, the change in the behavior model of the object may be tracked using the IMM filter. However, the exemplary embodiments are not limited to any premeasured type of filter 230.

Referring again to FIG. 5, the type corrector 240 determines the type of the object corrected at the current time point using the likelihood of the free behavior model, the likelihood of the constant speed model, and the measured type of the object, which are output from the filter 230, and outputs the determined corrected type to the second storage 250.

Figure 9:
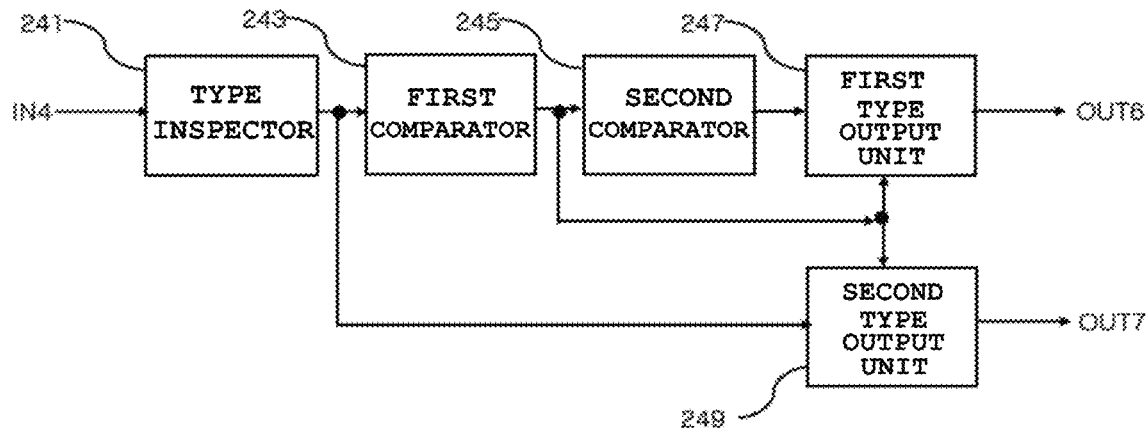
FIG. 9 is a block diagram of an exemplary embodiment of the type corrector shown in FIG. 5.

FIG. 9 is a block diagram of an exemplary embodiment 240A of the type corrector 240 shown in FIG. 5.

The type corrector 240A shown in FIG. 9 may include a type inspector 241, first and second comparators 243 and 245, and first and second type output units 247 and 249.

The type inspector 241 inspects whether the measured type received from the sensing unit 220 or the measured value generator 239 of the filter 230 through an input terminal IN4 is the first type or the unknown type, and outputs a result of inspection to the first comparator 243 and the second type output unit 249 as a control signal. That is, the type inspector 241 is configured to perform steps 132 and 138 shown in FIG. 4.

The first comparator 243 compares the likelihood of the free behavior model with the first threshold value TH1 in response to the control signal output from the type inspector 241, and outputs a result of comparison to the second comparator 245 and the first and second type output units 247 and 249. That is, the first comparator 243 is configured to perform steps 134 and 140 shown in FIG. 4.

The second comparator 245 compares the likelihood of the constant speed model with the second threshold value TH2 in response to a result of the comparison by the first comparator 243, and outputs a result of comparison to the first type output unit 247. That is, the second comparator 245 is configured to perform step 136 shown in FIG. 4.

The first type output unit 247 determines the type of the object corrected at the current time point to be the first type or the second type in response to a result of the comparison by the first comparator 243 or the second comparator 245, and outputs a result of determination to the second storage 250 through an output terminal OUT6. The first type output unit 247 is configured to perform steps 142 and 144 shown in FIG. 4.

That is, when it is determined that the likelihood of the free behavior model is greater than the first threshold value TH1 according to a result of the comparison by the first comparator 243, the first type output unit 247 determines the type of the object corrected at the current time point as the first type, and outputs a result of determination to the second storage 250 through the output terminal OUT6. Furthermore, when it is determined that the likelihood of the free behavior model is equal to or less than the first threshold value TH1 according to a result of the comparison by the first comparator 243 and when it is determined that the likelihood of the constant speed model is greater than the second threshold value TH2 according to a result of the comparison by the second comparator 245, the first type output unit 247 determines the type of the object corrected at the current time point as the second type, and outputs a result of determination to the second storage 250 through the output terminal OUT6. Furthermore, when it is determined that the likelihood of the free behavior model is equal to or less than the first threshold value TH1 according to a result of the comparison by the first comparator 243 and when it is determined that the likelihood of the constant speed model is equal to or less than the second threshold value TH2 according to a result of the comparison by the second comparator 245, the first type output unit 247 determines the type of the object corrected at the current time point as the first type, and outputs a result of determination to the second storage 250 through the output terminal OUT6.

The second type output unit 249 determines the type of the object corrected at the current time point as the first type or the unknown type in response to the control signal and a result of the comparison by the first comparator 243, and outputs a result of determination to the second storage 250 through an output terminal OUT7. The second type output unit 249 is configured to perform steps 142 and 146 shown in FIG. 4.

That is, when it is determined that the measured type is the unknown type in response to the control signal and when it is determined that the likelihood of the free behavior model is greater than the first threshold value TH1 according to a result of the comparison by the first comparator 243, the second type output unit 249 determines the type of the object corrected at the current time point as the first type, and outputs a result of determination to the second storage 250 through the output terminal OUT7. Furthermore, when it is determined that the measured type is the unknown type in response to the control signal and when it is determined that the likelihood of the free behavior model is equal to or less than the first threshold value TH1 according to a result of the comparison by the first comparator 243, the second type output unit 249 determines the type of the object corrected at the current time point as the unknown type, and outputs a result of determination to the second storage 250 through the output terminal OUT7.

Referring again to FIG. 1, the second storage 250 is configured to store the speed and the position of the object at the current time point, output from the joint probability distribution calculator 235, and the type, determined by the type corrector 240, and outputs a result of storage through an output terminal OUT1. The speed, the position, and the type of the object at the current time point t, stored in the second storage 250, may be provided to the filter 230 at a next time point t+1 after the current time point. That is, the speed, the position, and the type at the current time point t, stored in the second storage 250, may be provided to the filter 230 as a speed, a position, and a type according to which the speed, the position, and the type of the object are determined at the next time point.

The first storage 210 performs the same function as the second storage 250. That is, the previous speed, the previous position, and the previous type stored in the first storage 210 may correspond to the speed and the position output from the filter 230 at the previous time point and the corrected type output from the type corrector 240 at the previous time point.

That is, the first storage 210 may store and output Pt described in Equations 1 and 2, and the second storage 250 may store and output $P_{t+1}$ described in Equations 1 and 2.

Meanwhile, a recording medium in which a program for executing the method of tracking an object is recorded may store a program to implement a function of obtaining a likelihood of a free behavior model of the object and a likelihood of a constant speed model of the object using the position, the speed, and the type of the object determined at a previous time point t−1 and the position, the speed, and the type of the object measured at the current time point t, and a function of correcting a type of the object at the current time point using the likelihood of the free behavior model, the likelihood of the constant speed model, and the measured type of the object. The recording medium may be read by a computer system.

Furthermore, the function of obtaining the likelihood of the free behavior model and the likelihood of the constant speed model may include a function of determining the position of the object determined at the previous time point t−1 as a predicted first position of the free behavior model of the object, a function of obtaining a predicted second position of the constant speed model of the object using the position and the speed of the object determined at the previous time point t−1, a function of obtaining the likelihood of the free behavior model using the first position and the measured position, and a function of obtaining the likelihood of the constant speed model using the second position and the measured position.

Furthermore, the function of correcting the type of the object at the current time point may include a function of determining, when the measured type is a first type and when the likelihood of the free behavior model is greater than a first threshold value, the type of the object corrected at the current time point as the first type, a function of determining whether the likelihood of the constant speed model is greater than a second threshold value when the measured type is the first type and when the likelihood of the free behavior model is equal to or less than the first threshold value, a function of determining the type of the object corrected at the current time point as a second type, which is different from the first type, when the likelihood of the constant speed model is greater than the second threshold value, a function of determining the type of the object corrected at the current time point as the first type when the likelihood of the constant speed model is equal to or less than the second threshold value, a function of determining the type of the object corrected at the current time point as the first type when the measured type is an unknown type and when the likelihood of the free behavior model is greater than the first threshold value, and a function of determining the type of the object corrected at the current time point as the unknown type when the measured type is the unknown type and when the likelihood of the free behavior model is equal to or less than the first threshold value.

The computer-readable recording medium includes all kinds of recording apparatuses in which data configured for being read by a computer system are stored. Examples of the computer-readable recording medium include Read-Only Memory (ROM), Random Access Memory (RAM), Compact Disk ROM (CD-ROM), magnetic tape, floppy discs, and optical data storage. The computer-readable recording medium is configured to be distributed over network-connected computer systems so that the computer-readable code is stored and executed in a distributed fashion, functional programs, code, and code segments for accomplishing the method of tracking an object may be easily devised by programmers skilled in the art to which the present disclosure pertains.

Hereinafter, an object-tracking method according to a comparative example and the object-tracking method according to the exemplary embodiment will be described with reference to the accompanying drawings.

Figure 10A:
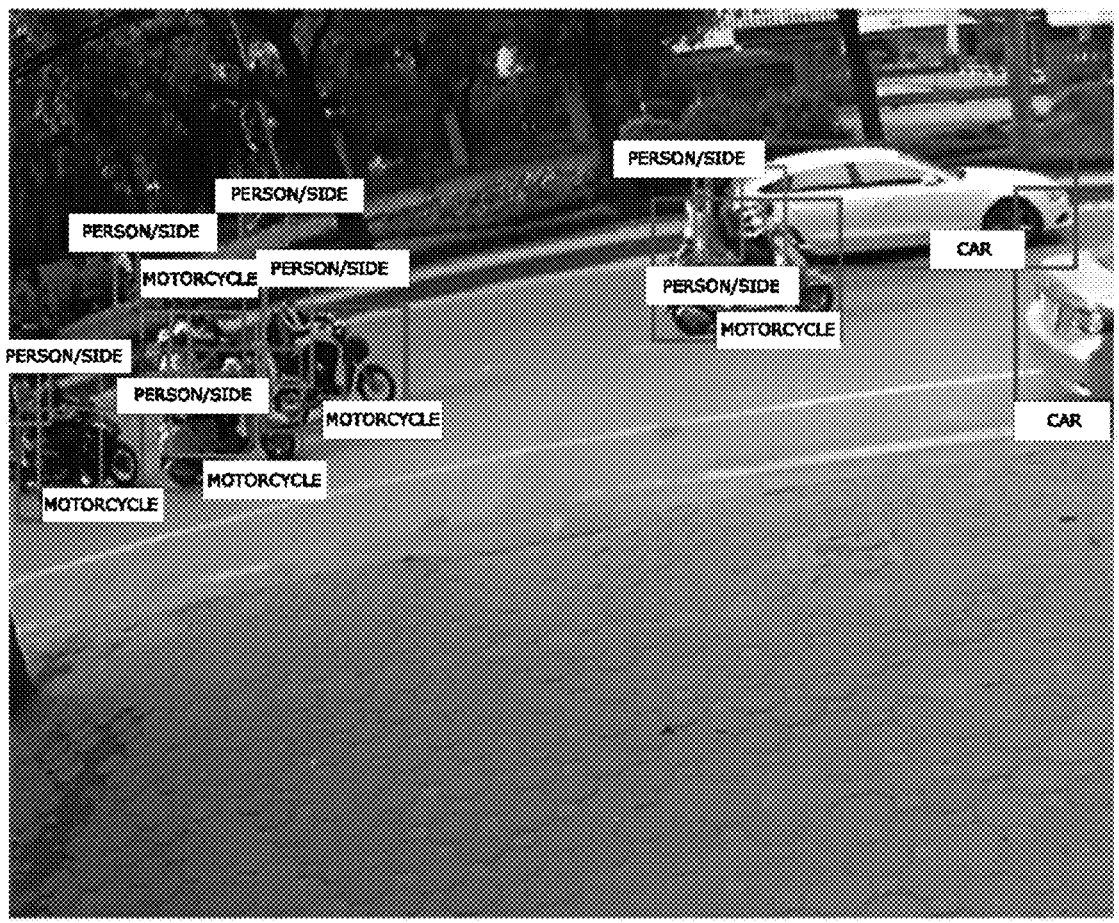
FIG. 10A and FIG. 10B are diagrams for explaining determination of the type of object according to a comparative example.
Figure 10B:
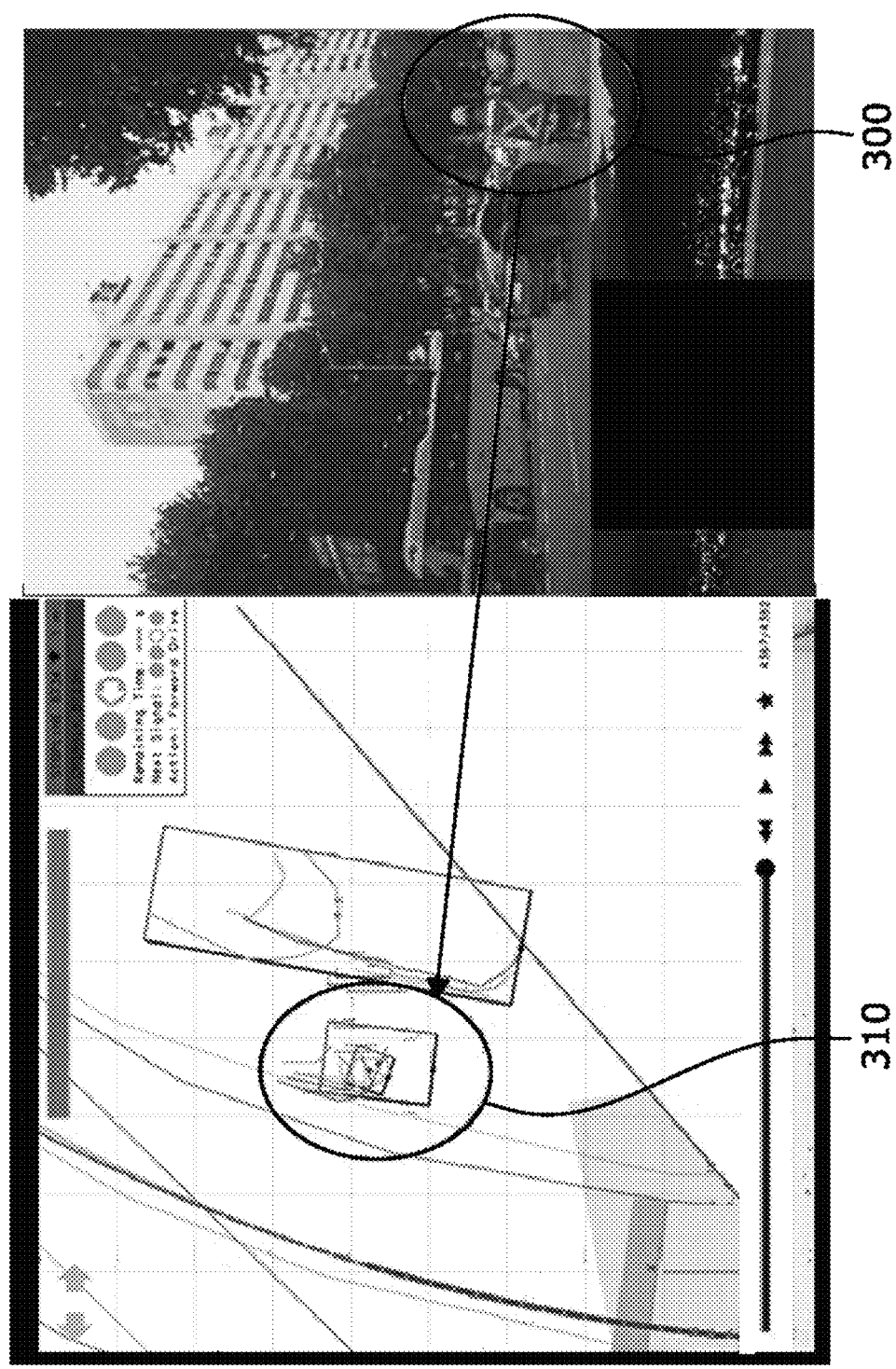

FIG. 10A and FIG. 10B are diagrams for explaining determination of the type of object according to a comparative example.

According to a first comparative example, the type of the object to be tracked is determined using a Light Detection and Ranging (LiDAR) detector or a RaDAR detector. However, when determining the type of the object in the present way, when the object is a pedestrian, it may be difficult to accurately determine the type of the object, and it is impossible to accurately obtain the position and the speed of the object.

According to a second comparative example, the type of the object to be tracked may be determined using an image detector including a camera. An example of detection of a pedestrian using an image is included in each of the first and second documents included in the aforementioned non-patent document list. However, in the case of the second comparative example, when the object is a two-wheeled vehicle including a bicycle or a motorcycle, as shown in FIG. 10A, the type of the object may be misrecognized as a pedestrian 310, rather than a two-wheeled vehicle 300, as shown in FIG. 10B, because a large portion of the body of a person riding on the two-wheeled vehicle is exposed to the outside, in the case of the second comparative example, the position and the speed of an object may be inaccurately obtained. Unlike a pedestrian, a two-wheeled vehicle has difficulty freely changing the speed and the direction thereof due to inertia, and thus a constant speed model is generally applied to a two-wheeled vehicle, as in the case of a vehicle. On the other hand, because a pedestrian is configured for freely changing the speed and the direction thereof, a free behavior model is generally applied to a pedestrian. In the case in which the type of object is not determined, a constant speed model is generally used.

In detector fusion logic according to a third comparative example, an Interacting Multiple Model (IMM) filter utilizes a behavior model of an object. For example, an example of multi-object detection/detector fusion using an IMM is included in each of the third and fourth documents included in the aforementioned non-patent document list. However, this is mainly used to respond to the case in which the behavior model changes.

In contrast, according to the exemplary embodiment of the present disclosure, the likelihood of the free behavior model and the likelihood of the constant speed model are obtained using positions predicted in parallel with respect to the free behavior model and the constant speed model and a measured position and are compared with threshold values, making it possible to correct and determine the type of object without relying only on an IMM filter. Accordingly, it is possible to prevent the occurrence of the situation in which an image detector incorrectly determines the type of object, thus accurately determining the type of object. That is, when the image detector misrecognizes a pedestrian as a two-wheeled vehicle, when the behavior model of the IMM filter more matches the free behavior model, the type of object is again recognized as a pedestrian, and when the behavior model of the IMM filter matches the constant speed model, the type of object is accurately recognized as a two-wheeled vehicle. According to the exemplary embodiment of the present disclosure, in the case in which a two-wheeled vehicle is misrecognized as a pedestrian or in which a pedestrian is detected as an object but the type of the object is not determined, the present error may be corrected through behavior model recognition. Accordingly, according to the exemplary embodiment of the present disclosure, it is possible to improve tracking performance and type recognition performance with respect to a pedestrian who does not follow the constant speed model. As a result, according to the exemplary embodiment of the present disclosure, it is possible to accurately determine the type of object, improving the accuracy of object tracking.

The object-tracking method and apparatus according to the above-described embodiments may be applied to an advanced driver assistance system (ADAS) or detector fusion, which receives the position and classification type of an object from an image detector of a vehicle.

As is apparent from the above description, according to a method and apparatus of tracking an object and a recording medium storing a program to execute the method according to various exemplary embodiments of the present disclosure, it is possible to accurately determine the type of an object, thus improving the accuracy of object tracking.

However, the effects achievable through the exemplary embodiments are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

Furthermore, for any element or process which is not described in detail in any of the various embodiments, reference may be made to the description of an element or a process having the same reference numeral in another exemplary embodiment of the present disclosure, unless otherwise specified.

Furthermore, the terms including "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of tracking an object, the method comprising:
   (a) obtaining a likelihood of a free behavior model of the object and a likelihood of a constant speed model of the object using a position, a speed, and a type of the object determined at a previous time point (t−1) and a position, a speed, and a type of the object determined at a current time point (t); and (b) determining the determined type of the object according to the likelihood of the free behavior model and the likelihood of the constant speed model, wherein the step (a) includes:

determining the position of the object obtained at the previous time point (t−1) as a predicted first position of the free behavior model of the object;

obtaining a predicted second position of the constant speed model of the object using the position and the speed of the object obtained at the previous time point (t−1);

obtaining the likelihood of the free behavior model using the first position and the determined position; and obtaining the likelihood of the constant speed model using the second position and the determined position, wherein the likelihood of the free behavior model is obtained as follows:

$$L1 = \frac{1}{\sqrt{2\pi}} e^{-0.5MH1^2}$$

$$MH1^2 = \frac{(PP1 - MP)^2}{C1}$$

where "L1" represents the likelihood of the free behavior model, "MH1" represents a Mahalanobis distance, "PP1" represents the first position, "MP" represents the determined position, and "C1" represents a covariance of the first position, and wherein the likelihood of the constant speed model is obtained as follows:

$$L2 = \frac{1}{\sqrt{2\pi}} e^{-0.5MH2^2}$$

$$MH2^2 = \frac{(PP2 - MP)^2}{C2}$$

where "L2" represents the likelihood of the constant speed model, "MH2" represents a Mahalanobis distance, "PP2" represents the second position, "MP" represents the determined position, and "C2" represents a covariance of the second position.

2. The method of claim 1, wherein the step (a) further includes:

sensing the position, the speed, and the type of the object using a plurality of detectors at the current time point; and determining a virtual position, a virtual speed, and a virtual type, respectively, generated using the position, the speed, and the type detected by the plurality of detectors according to a predetermined accuracy of each of the detectors, as the determined position, the determined speed, and the determined type, respectively.

3. The method of claim 1, wherein the step (b) includes:

determining, when the determined type is a first type and when the likelihood of the free behavior model is greater than a first threshold value, a type of the object corrected at the current time point as the first type;

determining whether the likelihood of the constant speed model is greater than a second threshold value when the determined type is the first type and when the likelihood of the free behavior model is equal to or less than the first threshold value;

determining the type of the object corrected at the current time point as a second type when the likelihood of the constant speed model is greater than the second threshold value, the second type being different from the first type;

determining the type of the object corrected at the current time point as the first type when the likelihood of the constant speed model is equal to or less than the second threshold value;

determining the type of the object corrected at the current time point as the first type when the determined type is an unknown type and when the likelihood of the free behavior model is greater than the first threshold value; and determining the type of the object corrected at the current time point as the unknown type when the determined type is the unknown type and when the likelihood of the free behavior model is equal to or less than the first threshold value.

4. The method of claim 3, wherein the step (b) includes:

not determining the type of the object corrected at the current time point when the determined type is neither the first type nor the unknown type.

5. The method of claim 4, wherein one of the first type and the second type is a pedestrian type, and a remaining one of the first type and the second type is a two-wheeled vehicle type.

6. An apparatus of tracking an object, the apparatus comprising:

a filter configured to generate a likelihood of a free behavior model of the object and a likelihood of a constant speed model of the object using a position, a speed, and a type of the object determined at a previous time point (t−1) and a position, a speed, and a type of the object determined at a current time point (t); and a type corrector configured to correct a type of the object at the current time point using the likelihood of the free behavior model, the likelihood of the constant speed model, and the determined type of the object, wherein the filter includes:

a free behavior model device configured to divert the position of the object obtained at the previous time point (t−1) as a predicted first position of the free behavior model of the object;

a constant speed model device configured to generate a predicted second position of the constant speed model of the object using the position and the speed of the object obtained at the previous time point (t−1); and a likelihood generator configured to generate the likelihood of the free behavior model using the first position and the determined position and to generate the likelihood of the constant speed model using the second position and the determined position, wherein the free behavior model device generates the likelihood of the free behavior model as follows:

$$L1 = \frac{1}{\sqrt{2\pi}} e^{-0.5MH1^2}$$

-continued $$MH1^2 = \frac{(PP1-MP)^2}{C1}$$

where "L1" represents the likelihood of the free behavior model, "MH1" represents a Mahalanobis distance, "PP1" represents the first position, "MP" represents the determined position, and "C1" represents a covariance of the first position, and wherein the constant speed model device generates the likelihood of the constant speed model as follows:

$$L2 = \frac{1}{\sqrt{2\pi}} e^{-0.5MH2^2}$$

$$MH2^2 = \frac{(PP2-MP)^2}{C2}$$

where "L2" represents the likelihood of the constant speed model, "MH2" represents a Mahalanobis distance, "PP2" represents the second position, "MP" represents the determined position, and "C2" represents a covariance of the second position.

7. The apparatus of claim 6, further including:
a sensing unit including a plurality of detectors configured to detect the position, the speed, and the type of the object at the current time point.

8. The apparatus of claim 7, wherein the filter further includes:
a measured value generator configured to output a virtual position, a virtual speed, and a virtual type, respectively, generated using the position, the speed, and the type detected by the plurality of detectors according to a predetermined accuracy of each of the detectors, as the determined position, the determined speed, and the determined type, respectively.

9. The apparatus of claim 6, wherein the type corrector includes:
a type inspector configured to inspect whether the determined type is a first type or an unknown type and to output a result of inspection as a control signal;
a first comparator configured to compare the likelihood of the free behavior model with a first threshold value in response to the control signal;
a second comparator configured to compare the likelihood of the constant speed model with a second threshold value in response to a result of comparison by the first comparator;
a first type output unit configured to determine the type of the object at the current time point as the first type or a second type in response to a result of comparison by the first comparator or the second comparator, the second type being different from the first type; and
a second type output unit configured to determine the type of the object at the current time point as the first type or the unknown type in response to the control signal and a result of comparison by the first comparator.

10. A computer-readable recording medium in which a program for executing a method of tracking an object is recorded, the recording medium storing a program to implement functions of:
(a) obtaining a likelihood of a free behavior model of the object and a likelihood of a constant speed model of the object using a position, a speed, and a type of the object determined at a previous time point (t−1) and a position, a speed, and a type of the object determined at a current time point (t); and
(b) correcting the type of the object at the current time point using the likelihood of the free behavior model, the likelihood of the constant speed model, and the determined type of the object,
wherein the function (a) includes:
a function of determining the position of the object obtained at the previous time point (t−1) as a predicted first position of the free behavior model of the object;
a function of obtaining a predicted second position of the constant speed model of the object using the position and the speed of the object obtained at the previous time point (t−1);
a function of obtaining the likelihood of the free behavior model using the first position and the determined position; and
a function of obtaining the likelihood of the constant speed model using the second position and the determined position,
wherein the likelihood of the free behavior model is obtained as follows:

$$L1 = \frac{1}{\sqrt{2\pi}} e^{-0.5MH1^2}$$

$$MH1^2 = \frac{(PP1-MP)^2}{C1}$$

where "L1" represents the likelihood of the free behavior model, "MH1" represents a Mahalanobis distance, "PP1" represents the first position, "MP" represents the determined position, and "C1" represents a covariance of the first position, and wherein the likelihood of the constant speed model is obtained as follows:

$$L2 = \frac{1}{\sqrt{2\pi}} e^{-0.5MH2^2}$$

$$MH2^2 = \frac{(PP2-MP)^2}{C2}$$

where "L2" represents the likelihood of the constant speed model, "MH2" represents a Mahalanobis distance, "PP2" represents the second position, "MP" represents the determined position, and "C2" represents a covariance of the second position.

11. The computer-readable recording medium of claim 10, wherein the function (a) further includes:
a function of sensing the position, the speed, and the type of the object using a plurality of detectors at the current time point; and
a function of determining a virtual position, a virtual speed, and a virtual type, respectively, generated using the position, the speed, and the type detected by the plurality of detectors according to a predetermined accuracy of each of the detectors, as the determined position, the determined speed, and the determined type, respectively.

12. The computer-readable recording medium of claim 10, wherein the function (b) includes:
a function of determining, when the determined type is a first type and when the likelihood of the free behavior model is greater than a first threshold value, a type of the object corrected at the current time point as the first type;

a function of determining whether the likelihood of the constant speed model is greater than a second threshold value when the determined type is the first type and when the likelihood of the free behavior model is equal to or less than the first threshold value;

a function of determining the type of the object corrected at the current time point as a second type when the likelihood of the constant speed model is greater than the second threshold value, the second type being different from the first type;

a function of determining the type of the object corrected at the current time point as the first type when the likelihood of the constant speed model is equal to or less than the second threshold value;

a function of determining the type of the object corrected at the current time point as the first type when the determined type is an unknown type and when the likelihood of the free behavior model is greater than the first threshold value; and a function of determining the type of the object corrected at the current time point as the unknown type when the determined type is the unknown type and when the likelihood of the free behavior model is equal to or less than the first threshold value.

* * * * *